US007566468B1

(12) United States Patent
Oberlin et al.

(10) Patent No.: US 7,566,468 B1

(45) Date of Patent: Jul. 28, 2009

(54) OIL FILTRATION PROCESS

(75) Inventors: Thomas L. Oberlin, Brookfield, WI (US); Eric J. Evraets, Mukwonago, WI (US); Steven L. Hughes, Brookfield, WI (US)

(73) Assignee: Oberlin Filter Company, Waukesha, WI (US)

( * ) Notice: Subject to any disclaimer, the term of this patent is extended or adjusted under 35 U.S.C. 154(b) by 0 days.

(21) Appl. No.: 12/039,862

(22) Filed: Feb. 29, 2008

(51) Int. Cl.
*A23L 2/00* (2006.01)

(52) U.S. Cl. .................... 426/330.6; 426/417; 426/422

(58) Field of Classification Search ............. 426/330.6, 426/417, 422
See application file for complete search history.

(56) References Cited

U.S. PATENT DOCUMENTS

| | | | | |
|---|---|---|---|---|
| 3,648,595 | A | 3/1972 | Morris | |
| 3,947,602 | A | 3/1976 | Clewell, Jr. et al. | |
| 3,968,741 | A | 7/1976 | Hunt | |
| 3,977,973 | A | 8/1976 | Anderson | |
| 4,068,571 | A * | 1/1978 | Cunningham | 99/408 |
| 4,519,904 | A | 5/1985 | Helmick | |
| 4,643,824 | A | 2/1987 | Akazawa et al. | |
| 4,861,494 | A | 8/1989 | Bratten | |
| 4,867,873 | A | 9/1989 | Akazawa | |
| 4,913,922 | A * | 4/1990 | Hawkes et al. | 426/417 |
| 4,945,893 | A | 8/1990 | Manchester | |
| 4,957,785 | A | 9/1990 | Driftholt et al. | |
| 4,962,698 | A | 10/1990 | Drijftholt et al. | |
| 5,045,200 | A | 9/1991 | Brook | |
| 5,049,264 | A | 9/1991 | Rosnack et al. | |
| 5,247,876 | A | 9/1993 | Wilson et al. | |
| 5,252,762 | A * | 10/1993 | Denton | 554/196 |
| 5,348,755 | A * | 9/1994 | Roy | 426/541 |
| 5,404,799 | A | 4/1995 | Bivens | |
| 5,486,370 | A | 1/1996 | Bivens | |
| 5,560,950 | A | 10/1996 | Conte et al. | |
| 5,731,024 | A | 3/1998 | Bivens | |
| 6,187,355 | B1 * | 2/2001 | Akoh et al. | 426/330.3 |
| 6,235,210 | B1 | 5/2001 | Saksena | |
| 6,368,648 | B1 | 4/2002 | Bertram et al. | |
| 6,783,685 | B2 | 8/2004 | Hwang | |
| 2002/0069767 | A1 | 6/2002 | Wendel et al. | |
| 2006/0076281 | A1 | 4/2006 | Aldeguer | |

FOREIGN PATENT DOCUMENTS

| | | |
|---|---|---|
| WO | WO 02/19879 | 3/2002 |

* cited by examiner

*Primary Examiner*—Chester T Barry
(74) *Attorney, Agent, or Firm*—Jansson Shupe & Munger Ltd.

(57) ABSTRACT

A process of continuous, on-line active filtration of cooking oil during food processing in a vat to remove free-fatty-acids and other undesirable impurities includes moving oil from the vat to a treatment tank; adding an amount of adsorbent to the oil in the treatment tank; mixing the oil and the adsorbent in the treatment tank for a time to allow substantially all of the free-fatty-acid adsorption of the process to occur in the tank; drawing treated oil from the treatment tank and moving it to a flatbed pressure filter; filtering the treated oil through the filter to remove the impurity-laden adsorbent therefrom; returning the filtered oil to the vat; and conducting the foregoing steps at a rate such that a volume of oil substantially equal to the volume of the vat is filtered each hour.

25 Claims, 2 Drawing Sheets

OIL FILTRATION PROCESS

FIELD

The invention relates generally to oil filtration processes and, more particularly, to on-line, continuous oil filtration processes for removing solids from cooking oil in industrial frying operations.

BACKGROUND

As part of the frying or oil-roasting process, the frying oil degrades. Undesirable byproducts form which affect the taste, color and shelf life of the finished products. The food industry recognizes that filters which remove solids from the frying oil can prolong the life of the oil. However, some of the byproducts of the oil breakdown are soluble and cannot be removed by simply filtering the solids from the oil. Hence, active filtration adsorbents, such as magnesium silicate, have been added to the oil for adsorbing the soluble byproducts. Most of these adsorbents are in powder form and as such increase the amount of solids which in turn must be removed from the frying oil.

Solids/liquids filters are common in the food industry. Gravity filters are common which use a disposable, non-woven filter media and the weight of the oil to force the oil through the media. Vacuum filters are used which often have woven metal screens to catch the solids and create a liquid vacuum to pull oil through the screen. Centrifuges are also used to remove the solids by centrifugal action. Another commonly used type of filter is a plate and frame which has a series of vertically-oriented plates containing filter media and pump pressure is used to force the oil through the media.

Filters can be used in a batch mode or in an on-line, continuous mode. In the batch mode the fryer is stopped and the oil removed to a treatment tank. The oil is then pumped to the filter from the treatment tank for solids removal. In the continuous mode the filter takes a slipstream of the oil through it and returns it directly (or indirectly through an intermediate tank) to the fryer while the fryer is on-line in normal operation.

The key difference between the two modes is that with continuous filtration the fryer does not have to be stopped and the oil removed for a separate, off-line filtration process. Many of the industrial frying lines use conveyors to continuously move the food through the frying oil bath. This bath often is maintained at temperatures of between about 275° F. and 415° F. Stopping the fryer to remove and filter the oil is not practical due to loss of production. Instead the operator might dilute the used oil with new oil to maintain acceptable amounts of oil degradation byproducts. For example, such process may be used to keep free-fatty-acid (FFA) levels less than 1% or to keep the color of the oil from becoming too dark.

Existing filters which can be used effectively in a continuous mode are the gravity, vacuum and centrifuge filters. However, none of them have the solids-removal efficiency to prevent migration of the filter aid adsorbent through the filter to the frying oil source. Some of these agents are quite fine (by design so that they have more surface area to allow greater adsorption) and one micron level filtration is necessary to remove them. In addition, the flow rate through the filter must be sufficient to keep up with the solids added through the normal frying process or the quality of the oil in the entire fryer will degrade over time. The combined requirement of high-solids-removal efficiency with sufficient flow rate generally exceeds performance of filters currently in use.

Plate and frame filters have better solids-removal efficiency but usually are manually operated and hence not well-suited for continuous operation. Because the oil is very hot, substantial downtime is required for the press to cool off so that an operator can unload it. Such filters are better suited to batch-mode operation.

U.S. Pat. No. 6,368,648 issued to Bertram et al, discloses an Adsorbent Filtration System for Treating Used Cooking Oil. The Bertram process suffers from a number of disadvantages. For example, the filter in Bertram requires complex oil circulation controls. Importantly, the system is inefficient because it requires more than one pass of the oil through the filter before it is returned to the fryer. The system is further inefficient and complex for its manner of adding adsorbent into the system. There are numerous diverting valves, transport lines, pumps and other structure required for operation of the system. Moreover, the adsorbent is not added directly to the oil, but rather is instead indirectly added into the transport lines. Such addition of adsorbent into the transport lines is contingent upon numerous process steps, including the accumulation and detection of two separate and "pre-determined" amounts of oil in the system. For at least these reasons, the Bertram process is undesirable because it is needlessly complicated and inefficient.

More specifically, in Bertram the process begins by filling the entire system with used cooking oil. The oil is drawn from the product supply (e.g., deep fryer) and is passed through the filter and into a holding tank. A filter cake is formed by adding adsorbent into the transfer lines of the system where the adsorbent mixes with used cooking oil. The oil and adsorbent are then passed to the holding tank and therefrom through the filter where the adsorbent contacts the filter and forms a filter cake. At no time is mixing occurring in the holding tank. Importantly, when adsorbent is added into the lines to mix with the oil, no oil is being passed through the filter. After the filter cake is deposited on the filter, oil is drawn from the product source and is passed through the filter and therefrom is returned to the product supply. During the filtering process, no adsorbent is added to the used cooking oil that is being drawn from the oil source and passed through to the filter. Bertram relies exclusively on the interaction of the oil with the filter cake for the removal of FFAs and other impurities. After twenty minutes of continuous flow of untreated oil from the product source through the filter and the filter cake, the filter cake is discharged. The system then resets beginning again with filling the system with used cooking oil and forming a new filter cake on the filter.

From the foregoing description of known systems, it can be seen, therefore, that there is a need within the industrial frying arena for a system which reliably and effectively adds filter aid adsorbent and uses a filter which can remove them in a continuous mode of operation.

OBJECTS

It is an object of the invention to provide an on-line, continuous active oil filtration process overcoming some of the problems and shortcomings of the prior art, including those referred to above.

Another object of the invention is to provide an on-line, continuous active oil filtration process that includes optimizing the usage of adsorbent and time.

Another object of the invention is to provide an on-line, continuous active oil filtration process requiring less operator monitoring or other intervention.

Still another object of the invention is to provide an on-line, continuous active oil filtration process capable of adjusting filtering cycles with respect to the amount of adsorbent and contaminants retained on the filter media.

Yet another object of the invention is to provide an on-line, continuous active oil filtration process having increased reliability.

Another object of the invention is to provide an on-line, continuous active oil filtration process that can accommodate changes in process conditions by automatic and adjustable addition of adsorbent.

Still another object of the invention is to provide an on-line, continuous active oil filtration process facilitating the maintenance of low levels of FFAs and other impurities in cooking oil.

Another object of the invention is to provide an on-line, continuous active oil filtration process wherein cooking oil does not appreciably degrade during successive filterings.

How these and other objects are accomplished will become apparent from the following descriptions and the figures.

SUMMARY

A process of continuous, on-line oil or fat active filtration while processing a food is disclosed. The process may be used, for example, to filter cooking oil or fat while simultaneously processing a food. The process facilitates a more reliable filtration process and maintains acceptable low levels of FFAs and other impurities in the cooking oil. The system and process are discussed in the context of filtration of cooking oil or fat but may be used for the continuous filtration of other impurity-laden fluids.

In preferred embodiments, the process comprises transferring oil from vat to a treatment tank during frying. The process further comprises adding an amount of adsorbent to the oil in the treatment tank to accommodate the transferred oil in the tank. Next, the oil and the adsorbent are mixed in the treatment tank by action of a simple mixing device for a sufficient time to allow substantially all of the FFAs and other impurities adsorption of the process to occur in the treatment tank. The treated oil is then drawn from the treatment tank and is moved to a filter device. The process comprises the further step of filtering the treated oil through the flatbed pressure filter to remove the impurity-laden adsorbent therefrom. In a preferred embodiment, the flatbed pressure filter has a filter media on which a filter cake of impurity-laden adsorbent forms as the treated oil is passed through the filter. The filtered oil is then returned to the cooking source. Finally, these steps as described are conducted at a rate such that oil in the vat has no more than an acceptable low level of FFAs and other undesirable impurities.

Preferably, the process includes the further step of controlling the time the oil and the adsorbent interact in the treatment tank by selecting a size for the treatment tank. In such embodiments, selecting a size for the treatment tank is dependent upon the flow rate of the oil through the flatbed pressure filter.

In other embodiments, the process includes the further step of sensing the level of pressure in the flatbed pressure filter and detecting a pressure set point that is dependent upon the amount of impurity-laden adsorbent on the filter media. In such embodiments, after the pressure set point is detected, the process includes the step of stopping the flow of oil to the flatbed pressure filter. It is highly preferred that such process includes the step of drying the filter cake after the pressure set point is detected. It is most highly preferred that the process includes the step of removing the spent media and the filter cake. The filter media is then automatically replaced after the spent filter media and filter cake are removed.

Still, in other preferred embodiments, adsorbent is added to the treatment tank only when oil is being drawn into the treatment tank. In such preferred embodiments, the process may include the further step of adding an amount of adsorbent to the oil in the treatment tank. The addition of adsorbent to the oil includes adjusting the amount of adsorbent added to the oil in the treatment tank, the variable amount of adsorbent being dependent upon the levels of FFAs and other desirable impurities in the oil.

Yet in other preferred embodiments, oil from the vat is transferred to the treatment tank when a predetermined low level of oil is detected in the treatment tank.

In most highly preferred embodiments, all of the steps of the process are conducted at a rate such that a volume of oil substantially equal to the volume of the vat is filtered each hour.

As used herein, the term "on-line" means done or accomplished during active operation of the system and process.

As used herein, the term "vat" means any vessel for holding a volume of oil therein.

As used herein, the term "substantially all of the adsorption of the process" means that the treatment tank is the site for adsorption, rather than another location in the system.

As used herein, the term "active filtration" (as opposed to passive filtration) means filtration involving the use of an adsorbent which allows FFAs and other impurities which by themselves cannot be filtered out of the system to bond to a filterable substance (i.e., the adsorbent) for removal by filtration.

DETAILED DESCRIPTION

Figure 1:
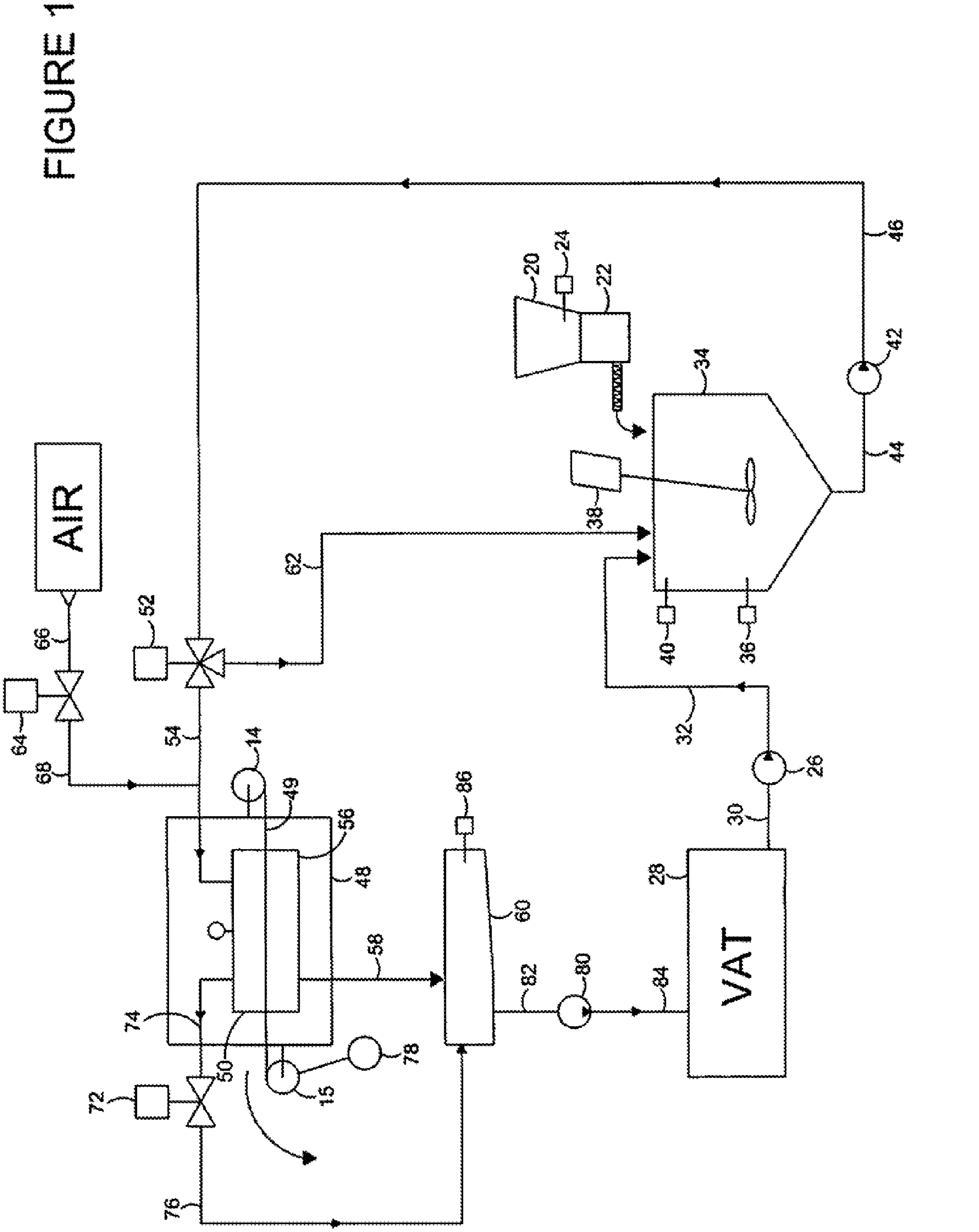
FIG. 1 is a schematic drawing of an embodiment of the process disclosed herein.

Referring to FIG. 1, a process of continuous, on-line oil or fat active filtration while frying a food will be described. It is to be understood that, although the process will be described in a step-wise fashion, each of the steps is occurring simultaneously while the system is on-line and in normal operation. The particular order of any one step is not critical to the functioning of this system.

As used herein, "filter aid" refers to either a passive filter aid, such as diatomaceous earth, or an active, adsorbing, purifying agent, such as magnesium silicate. Other additives may be included to enhance the quality of the oil and food product, including, for example, activated carbons, alumina, bleaching materials, silicates, silicas and silica gels.

As shown in FIG. 1, a hopper 20 is positioned on the top of a feeder device 22. A filter aid including at least an adsorbent is placed in the hopper 20 until the feeder device 22 and the hopper 20 are full. A level sensor 24 is positioned in the hopper 20 for detecting a low level of filter aid. When level sensor 24 detects a low level of filter aid in the hopper 20, the operator is alerted to add more filter aid to the hopper 20.

The system 10 is started and a pump 26 draws oil from a cooking source 28 through a line 30, pump 26, line 32 and into a treatment tank 34. Any number of pumps may be used including, for example, centrifugal and air-operated diaphragm pumps, as long as they can handle the high operation temperatures. The cooking source may be a roaster, a fryer or any other device used for processing foodstuffs. Treatment tank 34 fills and at a certain volume, enables a level sensor 36. When level sensor 36 detects a volume of oil in the treatment tank 34, a tank mixer 38 and feeder 22 are enabled. Feeder 22 continues to run until the treatment tank 34 is full. When a level sensor 40 detects that treatment tank 24 is full, feeder 22 and pump 26 stop operation.

Tank mixer 38 continues to run when the volume of oil in the treatment tank 34 is at or above level sensor 36.

Feeder 22 meters a constant volume of filter aid into treatment tank 34 to treat the transferred oil in the treatment tank 34. The volume added is constant with respect to the volume of oil between level sensors 36 and 40 and with respect to the rate at which the volume is filled in the treatment tank 34. In normal operation of the process, the step of metering a constant volume of filter aid, as described, continuously repeats whenever a filter device 48 is running. Further, filter aid is only added while the treatment tank 34 is being filled.

As process conditions change, it might be necessary or desirable to vary the amount of filter aid adsorbent metered into the treatment tank 34. Controls (not shown) enable the operator to vary the speed at which the feeder scroll rotates (operation of the filter is discussed more fully below), which is directly related to dosage of filter aid. The operator can add more filter aid adsorbent to the treatment tank 34 and further reduce the level of FFAs and other undesirable impurities. Alternatively, operating costs can be reduced by decreasing the amount of filter aid adsorbent while maintaining, for example, an acceptable low level of FFAs and other impurities. As improved sensors for detecting the levels of undesirable impurities in the oil become available, this optimization process will become further automated.

The filter aid adsorbent added to the treatment tank mixes with the cooking oil in the treatment tank for a sufficient time to allow substantially all of the FFAs and other undesirable impurities adsorption of the process to occur in the treatment tank. Interaction time of the filter aid with the cooking oil is controlled by optimally sizing the treatment tank 34. In the case of edible oil filtration, more interaction time is not always desirable. Impurities and other unwanted byproducts, such as soaps, can form if the filter aid adsorbent and cooking oil are allowed to interact for too long. The treatment tank is optimally sized with respect to the flow rate of the cooking oil through the filter device 48. Generally, the treatment tank 34 is of a size that is small enough so that its entire volume can be filtered through the entire system within ten minutes, for example (this time will vary depending upon the filter aid used). On the other hand, the treatment tank is of a size that is large enough so that the filter aid adsorbent, once added, will not reach the filter device 48 for at least two minutes (again, this time varies according to the adsorbent used).

The system 10 is started and it runs simultaneously with the treatment tank 34 operation. Pump 42 runs drawing treated oil from treatment tank 34 through line 44, pump 42, and line 46 and then moves the treated oil to the filter device 48. The treated oil is filtered thereby removing the impurity-laden filter aid adsorbent therefrom. The filtered oil is then returned to the vat 28. The above-described steps of the process are conducted at a rate such that the oil in the vat 28 has no more than an acceptable low level of FFAs and other undesirable impurities. In some cases, the steps are conducted at a rate such that a volume of oil substantially equal to the volume of the vat 28 is filtered each hour.

The filter 48 may be of the flatbed pressure filter type. A flatbed pressure filter is one in which a filter medium is sealed between two horizontally opposed surfaces. The horizontal nature of the filter facilitates easy formation and maintenance of a filter cake. No complex oil circulation controls are needed. A flatbed pressure filter is typically used for processing a liquid and foreign matter mixture. The mixture is pumped to an upper filter chamber having a filter media bottom. The filter media can be a filter cloth, a filter paper or any other media capable of retaining the filter aid and impurities. Most preferably, a highly efficient non-woven filter fabric is used so that only one pass through the filter is necessary to remove all of the solids and added filter aid adsorbent from the cooking oil.

In preferred embodiments, the filter media is capable of retaining particles of one micron in size. The filter media is attached to a conveying device (not shown) which permits spent media to be readily removed from the filter 48. Because the filter media is disposable, it does not require the further step of cleaning the filter media. A movable upper chamber 50, which seals the mixture in the filter device 48 during operation, is raised to allow this movement. High pressures are used to promote liquid flow through the filter.

The flat bed type filter offers the user a relatively simple device to operate, a large filter media area to allow high through-put, and flexibility to meet varying operating conditions. The use of a flatbed pressure filter is ideal in situations where operator involvement and costs are to be kept at a minimum.

Referring again to FIG. 1, filter device 48 includes upper chamber 50 and a lower chamber 56. The filter chambers open for easy access and cleaning. Platen seals (not shown) on the perimeter of the chambers create a liquid-tight seal completely around the filter media. With the system 10 started and having clean filter media loaded in the filter device 48, upper chamber 50 lowers thereby sandwiching the filter media between chambers 50 and 56. A valve 52 opens passing oil under pressure through line 54 into upper chamber 50, through the filter media, into lower chamber 56, through line 58 and into a filtrate tank 60.

The filter device 48 remains in the above-described filtering cycle until pressure in upper chamber 50 reaches a pressure set point, also referred to as the "stop filtering/start dry cycle" set point. The pressure set point is between about 28 psig and 32 psig. Optimally, the pressure set point is about 30 psig.

As solids are trapped on the filter media, a filter cake forms inside the flatbed pressure filter. The filter pressure will increase and the filter flow rate will decrease. The pressure increase triggers pressure sensors (described below) which will advance the filter cycle to drying and discharging of the filter cake. A new section of filter media will be automatically and quickly positioned in the filter chamber.

If the filter 48 is not quickly cycled back on-line with a clean section of filter media, solids and other undesirable impurities will accumulate inside the cooking device. If too many solids form, for example, the effectiveness of the adsorption process may be significantly reduced and the flow rate through the filter 48 further reduced. Consequently, dirt continues to build up in the cooking source 28 and adsorption is reduced leading to an unstable system.

The automatic pressure sensing and cycling of the pressure filter 48 enables the filter 48 to automatically adjust to operation conditions. The filter 48 can shorten filter cycles, increase flow rate by automatically inserting clean filter media and maintaining substantially constant average flow rates. The importance, therefore, of the automatic and prompt discharge of the filter cake and replacement of the filter media to process stability and reliability is apparent.

The "stop feed/start dry pressure" set point initiates the filter cake dry cycle. Valve 52 closes bypassing oil through line 62 and back into the treatment tank 34. This bypass operation maintains flow in the lines and prevents solids from settling in the lines and obstructing them. Valve 64 opens passing pressurized gas from line 66 through valve 64, lines 54 and 68 and into upper chamber 50. The pressurized gas continues to pass through the filter cake, filter media and back to the filtrate tank 60. Types of gas which may be used include, for example nitrogen or compressed air.

Once all the remaining oil in upper chamber 50 has been expelled through the filter cake, the pressure drops because line 68 is too small to maintain pressure in upper chamber 50. The filter pressure will drop to a "start the final dry" set point. This set point is typically between about 15 psig and 25 psig. In preferred embodiments, the set point is about 25 psig. The start final dry pressure set point initiates the final dry portion of the filter cake dry cycle. The final portion of the dry cycle is timed. Longer final drying times will reduce the amount of free oil in the filter cake.

Once the final cake dry is complete (i.e., the timer expires), valve 64 closes, valve 72 opens relieving any residual pressure from upper chamber 50 through line 74, valve 72, line 76 and into filtrate tank 60. Valve 72 is open for a timed duration of typically about 5 seconds. However, this time may range from between about 2 seconds to 5 seconds. Once valve 72 closes, upper chamber 50 raises and once fully opened, an electric reroller motor 78 begins to run. The electric roller motor 78 pulls the spent media and filter cake out of filter device 48 while locating a clean, new piece of media between upper and lower chambers, 50 and 56, respectively. The reroller motor 78 runs for a predetermined length, or distance, winding up the media onto a bar (not shown). When the reroller motor 78 stops, the entire cycle starts over. The system 10 runs continuously until stopped using automated controls.

Whenever system 10 is on-line in normal operation and pump 42 is running, pump 80 is also running. Pump 80 draws oil from filtrate tank 60 through line 82, pump 80, line 84 and into the cooking source 28. A level sensor 86 is a high-level switch that activates pump 80 automatically if the volume of oil in the treatment tank 34 is too high. Level sensor 86 also sounds an alarm. The level controls may change where there are multiple sensors involved in starting and/or stopping operation of pump 80 based upon the levels of oil detected in the filtrate tank 60.

Figure 2:
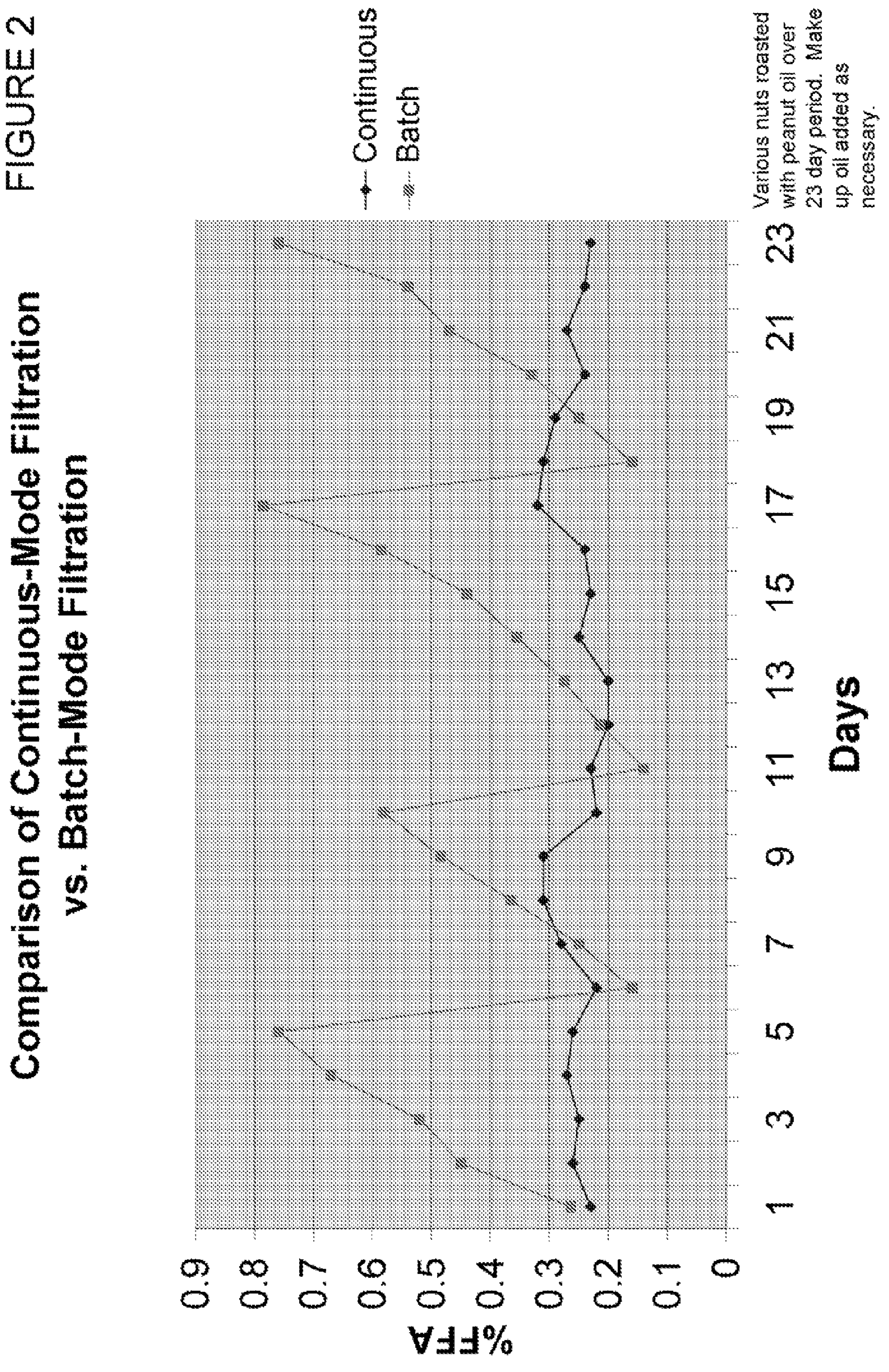
FIG. 2 is a line graph of a comparison of a continuous, on-line active filtration process versus a batch-type process filtration.

Referring now to FIG. 2, an exemplary comparison of continuous, active on-line oil filtration treatment versus a batch-mode filtration treatment is shown. Various nuts were roasted with peanut oil over a period of twenty-three days. The level of FFAs in the oil was monitored throughout the period. The filter selected was of a flatbed pressure filter type commercially available from Oberlin Filter Company of Waukesha, Wis. A magnesium silicate filter aid adsorbent was used.

It can be seen that the continuous, active on-line oil filtration treatment resulted in a substantially constant level of FFAs in the oil. More specifically, using the process described herein, the oil contained from about 0.2% FFAs and about 0.3% FFAs. Such improved results are obtained from only one pass of the oil through the filter before it is returned to the cooking vat. This is in stark contrast to the batch-type process which yielded erratic and drastic changes in the levels of FFAs. In the batch-type process, the levels of FFAs ranged from about 0.15% to about 0.8% FFAs. It can be seen, therefore, that the continuous, on-line active filtration of oil using a flat bed pressure filter maintains substantially constant and low levels of FFAs in the cooking oil.

While the principles of the invention have been shown and described in connection with specific embodiments, it is to be understood that such embodiments are by way of example and are not limiting.

The invention claimed is:

1. A process of continuous, on-line active filtration of cooking oil while frying a food in a vat to remove free-fatty-acids and other undesirable impurities, the process comprising the steps of:

(a) transferring oil from the vat to a treatment tank during frying;

(b) adding an amount of adsorbent to the oil in the treatment tank to accommodate the transferred oil in the tank;

(c) mixing the oil and the adsorbent in the treatment tank by action of a mixing device for a sufficient time to allow substantially all of the free-fatty-acid adsorption of the process to occur in the tank;

(d) drawing treated oil from the treatment tank and moving it to a flatbed pressure filter;

(e) filtering the treated oil through the flatbed pressure filter to remove the impurity-laden adsorbent therefrom, the flatbed pressure filter having a filter media on which a filter cake of impurity-laden adsorbent forms;

(f) returning the filtered oil to the vat; and (g) conducting steps (a) through (f) at a rate such that the oil in the vat has no more than an acceptable low level of free-fatty-acids and other undesirable impurities.

2. The process of claim 1 further including the step of controlling the time the oil and the adsorbent interact in the treatment tank by selecting a size for the treatment tank.

3. The process of claim 2 wherein selecting a size for the treatment tank is dependent upon the flow rate of the oil through the flatbed pressure filter.

4. The process of claim 1 further including the step of sensing the level of pressure in the flatbed pressure filter and detecting a pressure set point that is dependent upon the amount of impurity-laden adsorbent on the filter media.

5. The process of claim 4 further including the step of, after the pressure set point is detected, stopping the flow of oil to the flatbed pressure filter.

6. The process of claim 5 further including the step of drying the filter cake after the pressure set point is detected.

7. The process of claim 6 further including the step of removing the spent media and the filter cake.

8. The process of claim 7 further including the step of automatically replacing filter media after removing the spent filter media and filter cake.

9. The process of claim 1 wherein adsorbent is added to the tank only when oil is being drawn into the treatment tank.

10. The process of claim 9 wherein the step of adding an amount of adsorbent to the oil in the treatment tank includes adjusting the amount of adsorbent added to the oil in the treatment tank, the variable amount of adsorbent being dependent upon the levels of free-fatty-acids and other undesirable impurities in the oil.

11. The process of claim 1 wherein oil from the vat is transferred to the treatment tank when a predetermined low level of oil is detected in the treatment tank.

12. The process of claim 1 wherein steps (a) through (f) are conducted at a rate such that a volume of oil substantially equal to the volume of the vat is filtered each hour.

13. The process of claim 1 wherein the acceptable low level of free-fatty-acids and other undesirable impurities is a constant.

14. A process of continuous, on-line active filtration of cooking oil while frying a food in a vat to remove free-fatty-acids and other undesirable impurities, the process comprising the steps of:

(a) moving oil from the vat to a treatment tank during frying;

(b) adding an amount of adsorbent to the oil in the treatment tank to accommodate the transferred oil in the tank;

(c) mixing the oil and the adsorbent in the treatment tank by action of a mixing device for a sufficient time to allow substantially all of the free-fatty-acid adsorption of the process to occur in the tank;

(d) drawing treated oil from the treatment tank and moving it to a flatbed pressure filter;

(e) filtering the treated oil through the flatbed pressure filter to remove the impurity-laden adsorbent therefrom, the flatbed pressure filter having a filter media on which a filter cake of impurity-laden adsorbent forms;

(f) returning the filtered oil to the vat;

(g) preventing the level of free-fatty-acids and other undesirable impurities in the oil from rising above an acceptable low level; and (h) conducting steps (a) through (g) at a rate such that the oil in the vat has no more than an acceptable low level of free-fatty-acids and other undesirable impurities.

15. The process of claim 14 further including the step of controlling the time the oil and the adsorbent interact in the treatment tank by selecting a size for the treatment tank.

16. The process of claim 15 wherein selecting a size for the treatment tank is dependent upon the flow rate of the oil through the flatbed pressure filter.

17. The process of claim 14 further including the step of sensing the level of pressure in the flatbed pressure filter and detecting a pressure set point that is dependent upon the amount of impurity-laden adsorbent on the filter media.

18. The process of claim 17 further including the step of, after the pressure set point is detected, stopping the flow of oil to the flatbed pressure filter.

19. The process of claim 18 further including the step of drying the filter cake after the pressure set point is detected.

20. The process of claim 19 further including the step of removing the spent media and the filter cake.

21. The process of claim 20 further including the step of automatically replacing filter media after removing the spent filter media and filter cake.

22. The process of claim 14 wherein adsorbent is added to the tank only when oil is being drawn into the treatment tank.

23. The process of claim 22 wherein the step of adding an amount of adsorbent to the oil in the treatment tank includes adjusting the amount of adsorbent added to the oil in the treatment tank, the variable amount of adsorbent being dependent upon the levels of free-fatty-acids and other undesirable impurities in the oil.

24. The process of claim 14 wherein the acceptable low level of free-fatty-acids and other undesirable impurities is a constant.

25. The process of claim 14 wherein steps (a) through (g) are conducted at a rate such that a volume of oil substantially equal to the volume of the vat is filtered each hour.

* * * * *